(12) United States Patent
Zhang et al.

(10) Patent No.: US 9,886,125 B2
(45) Date of Patent: Feb. 6, 2018

(54) IN-CELL TOUCH SCREEN AND DISPLAY DEVICE

(71) Applicants: Boe Technology Group Co., Ltd., Beijing (CN); Ordos Yuansheng Optoelectronics Co., Ltd., Inner Mongolia (CN)

(72) Inventors: Jie Zhang, Beijing (CN); Jun Fan, Beijing (CN); Fuqiang Li, Beijing (CN); Xue Dong, Bejing (CN); Xiaochuan Chen, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 0 days.

(21) Appl. No.: 14/908,648

(22) PCT Filed: Aug. 20, 2015

(86) PCT No.: PCT/CN2015/087694
§ 371 (c)(1),
(2) Date: Jan. 29, 2016

(87) PCT Pub. No.: WO2016/145784
PCT Pub. Date: Sep. 22, 2016

(65) Prior Publication Data
US 2017/0038887 A1 Feb. 9, 2017

(30) Foreign Application Priority Data
Mar. 13, 2015 (CN) .......................... 2015 1 0112681

(51) Int. Cl.
*G06F 3/044* (2006.01)
*G06F 3/041* (2006.01)
(Continued)

(52) U.S. Cl.
CPC .......... *G06F 3/0416* (2013.01); *G02F 1/1333* (2013.01); *G02F 1/1368* (2013.01);
(Continued)

(58) Field of Classification Search
CPC .. G06F 3/044; G06F 2203/04107–2203/04111
See application file for complete search history.

(56) References Cited

U.S. PATENT DOCUMENTS

2010/0265210 A1* 10/2010 Nakanishi ........... G02F 1/13338
345/174
2013/0162570 A1* 6/2013 Shin ........................ G06F 3/041
345/173
(Continued)

FOREIGN PATENT DOCUMENTS

CN 102253544 A 11/2011
CN 103930747 7/2014
(Continued)

OTHER PUBLICATIONS

International Search Report and Written Opinion from PCT/CN15/87694 dated Dec. 4, 2015.
(Continued)

*Primary Examiner* — Sanghyuk Park
(74) *Attorney, Agent, or Firm* — Calfee, Halter & Griswold LLP (57) ABSTRACT

An in-cell touch screen and display device, which multiplex the common electrode layer as self-capacitance electrodes using self-capacitance principle, modify the pattern of the common electrode layer to segment it into a plurality of independent self-capacitance electrodes, and add on the array substrate touch control data lines that connect the respective self-capacitance electrodes to the touch control detection chip. Orthographic projections of the respective touch control data lines on the array substrate are all within
(Continued)

areas where gaps between the pixel areas reside, so as to not affect the aperture ratio of pixel. Embodiments of the present invention modify the structure of the common electrode layer to segment it into self-capacitance electrodes, thus avoiding additional processes of manufacturing an array substrate, saving the production cost, and improving the production efficiency.

19 Claims, 6 Drawing Sheets

(51) Int. Cl.
*G02F 1/1333* (2006.01)
*G02F 1/1343* (2006.01)
*G02F 1/1362* (2006.01)
*G02F 1/1368* (2006.01)
*G06F 3/047* (2006.01)

(52) U.S. Cl.
CPC ...... *G02F 1/13338* (2013.01); *G02F 1/13439* (2013.01); *G02F 1/133308* (2013.01); *G02F 1/133345* (2013.01); *G02F 1/134336* (2013.01); *G02F 1/136227* (2013.01); *G02F 1/136286* (2013.01); *G06F 3/044* (2013.01); *G06F 3/047* (2013.01); *G06F 3/0412* (2013.01); *G02F 2001/134318* (2013.01); *G02F 2201/121* (2013.01); *G02F 2201/123* (2013.01)

(56) References Cited

U.S. PATENT DOCUMENTS

| | | | |
|---|---|---|---|
| 2014/0184559 | A1 | 7/2014 | Han et al. |
| 2015/0153858 | A1* | 6/2015 | Kim ................ G06F 3/044 |
| | | | 345/173 |
| 2015/0370114 | A1* | 12/2015 | Du .................. G02F 1/13338 |
| | | | 349/12 |
| 2016/0011705 | A1 | 1/2016 | Huang |
| 2016/0018916 | A1* | 1/2016 | Lee ................ G09G 3/3208 |
| | | | 345/173 |
| 2016/0048241 | A1 | 2/2016 | Zhao et al. |

FOREIGN PATENT DOCUMENTS

| | | |
|---|---|---|
| CN | 103941495 A | 7/2014 |
| CN | 104020891 | 9/2014 |
| CN | 104020892 A | 9/2014 |
| CN | 104020893 | 9/2014 |
| CN | 104020909 | 9/2014 |
| CN | 104035640 | 9/2014 |
| CN | 203930747 | 11/2014 |
| CN | 104536637 | 4/2015 |
| CN | 104657024 | 5/2015 |
| CN | 204440372 | 7/2015 |
| KR | 20140085018 | 7/2014 |

OTHER PUBLICATIONS

Office action from Chinese Application No. 201510112681.5 dated Mar. 3, 2017.
Second Office Action for Chinese Patent Application No. 201510112681.5 dated Jun. 21, 2017.
Third Office Action for Chinese Patent Application No. 201510112681.5 dated Sep. 22, 2017.

* cited by examiner

IN-CELL TOUCH SCREEN AND DISPLAY DEVICE

RELATED APPLICATIONS

The present application is the U.S. national phase entry of PCT/CN2015/087694, with an international filing date of Aug. 20, 2015, which claims priority to Chinese Application No. 201510112681.5, filed Mar. 13, 2015, the entire disclosures of which are incorporated by reference herein.

FIELD OF THE INVENTION

The present invention relates to the technical field of touch control, particularly to an in-cell touch screen and display device.

BACKGROUND OF THE INVENTION

At present, an existing in-cell touch screen enables detection of the finger touch position using mutual-capacitance or self-capacitance principle. Therein, using self-capacitance principle, it is possible to arrange in the touch screen a plurality of self-capacitance electrodes which are arranged in the same layer and insulated from one another. When a human body does not touch the screen, the capacitances experienced by the respective self-capacitance electrodes are a fixed value. When a human body touches the screen, the capacitances experienced by the corresponding self-capacitance electrodes are the fixed value plus the capacitance of the human body. A touch control detection chip can determine a position of touch control by detecting variations in the capacitance values of the respective self-capacitance electrodes in a touch control time period. Since the capacitance of the human body can act on all the self-capacitance, while it can only act on a projected capacitance in the mutual-capacitance, as compared to a touch screen manufactured by mutual-capacitance principle, there would be a larger amount of variation of touch control resulting from the touch of screen by the human body in a touch screen manufactured by self-capacitance principle. Therefore, with respect to the touch screen using mutual-capacitance, the touch screen using self-capacitance can effectively increase the signal to noise ratio of touch control to thereby improve the accuracy of touch control induction.

However, during design of the structure of the above capacitive in-cell touch screen, a new film layer is required on the interior of an existing display panel, which leads to the need of adding new processes at the time of manufacturing the panel. This increases the production cost and does not facilitate improvement of the production efficiency.

In addition, at present, the liquid crystal display techniques capable of realizing wide viewing angle mainly include In-Plane Switch (IPS) technique and Advanced Super Dimension Switch (ADS) technique. The ADS technique forms a multi-dimensional electric field by virtue of an electric field generated at the edges of slit electrodes in the same plane and an electric field generated between a slit electrode layer and a plate-like electrode layer, such that the liquid crystal molecules in all orientations between the slit electrodes and right above the electrodes in the liquid crystal cell can rotate, thereby improving the work efficiency of liquid crystal and increasing the light transmission efficiency. The advanced super dimension switch technique can improve the image quality of the TFT-LCD product, which has advantages, such as high resolution, high transmissivity, low power consumption, wide viewing angle, high aperture ratio, low color difference, and having no push Mura etc.

On the basis of the traditional ADS technique and one important improvement H-ADS (high aperture ratio—advanced super dimension switch) of the ADS technique, the embodiments of the present invention propose a novel capacitive in-cell touch screen structure to overcome the aforesaid technical problem.

SUMMARY OF THE INVENTION

Accordingly, the embodiments of the present invention provide an in-cell touch screen and a display device for reducing the production cost of the in-cell touch screen and improving the production efficiency.

In one embodiment, an in-cell touch screen is provided which comprises an array substrate having a plurality of pixel areas arranged in an array, wherein the array substrate is provided with: a common electrode layer segmented into a plurality of self-capacitance electrodes independent from each other; and touch control data lines which are arranged in a different layer from and connected to said self-capacitance electrodes, wherein orthographic projections of said respective touch control data lines on said array substrate all being within areas where gaps between the pixel areas reside; and wherein said in-cell touch screen further comprises a touch control detection chip connected to the respective self-capacitance electrodes via said touch control data lines, wherein said touch control detection chip is used for loading a common electrode signal for said respective self-capacitance electrodes via said touch control data lines in a display time period, and detecting variation in capacitance values of said respective self-capacitance electrodes via said touch control data lines in a touch control time period to determine a touch control position.

According to a preferred embodiment, each of said self-capacitance electrodes covers several pixel areas.

According to a preferred embodiment, each of the pixel areas of said array substrate is provided with a thin film transistor structure which is located below said common electrode layer and closer to a substrate of said array substrate, and said touch control data lines are located in a film layer between said common electrode layer and said thin film transistor structure.

According to a further preferred embodiment, said array substrate is further provided with gate signal lines and data signal lines which are arranged across each other, and the extension direction of said touch control data lines is identical with that of said gate signal lines, or identical with that of said data signal lines.

According to a further preferred embodiment, the bezel of said in-cell touch screen has four sides, and said respective self-capacitance electrodes are connected to said touch control detection chip after being connected to the nearest side via the corresponding touch control data lines on the basis that said touch control data lines do not cross with each other.

According to a preferred embodiment, said touch control data lines are distributed uniformly on said array substrate.

According to a further preferred embodiment, leads that are arranged at said sides for connecting said touch control data lines to said touch control detection chip are designed to have a wider line width than said touch control data lines.

According to a preferred embodiment, said array substrate is further provided with pixel electrodes located between said common electrode layer and the film layer where said touch control data lines reside.

According to a further preferred embodiment, said array substrate is provided with first conducting parts which are arranged in the same layer as and insulated from said pixel electrodes, and said self-capacitance electrode is connected to a respective touch control data line via said first conducting part.

According to a further preferred embodiment, said common electrode layer is a plate-like electrode, said pixel electrode is a slit electrode, and an insulating layer is provided between said pixel electrode and said common electrode layer.

According to another preferred embodiment, said array substrate is further provided with pixel electrodes which are located above said common electrode layer and are farther from said array substrate.

According to a further preferred embodiment, said array substrate is further provided with second conducting parts which are arranged in the same layer as and insulated from said common electrode layer, and a drain of said thin film transistor is connected to said pixel electrode via said second conducting part.

According to a further preferred embodiment, said pixel electrode is a plate-like electrode, said common electrode layer is a slit electrode, and an insulating layer is provided between said pixel electrode and said common electrode layer.

According to a further preferred embodiment, said slit electrode has a slit structure at a position corresponding to an opening area of said pixel area.

According to a preferred embodiment, said pixel electrode and said common electrode layer are both ITO electrodes.

According to a preferred embodiment, said thin film transistor structure is a bottom-gate-type thin film transistor or a top-gate-type thin film transistor.

According to a further preferred embodiment, when said thin film transistor structure is a top-gate-type thin film transistor, a shading layer is further provided between said top-gate-type thin film transistor and a base substrate; an orthographic projection of a pattern of said shading layer on said array substrate covers an orthographic projection of a pattern of the gate in said thin film transistor structure on said array substrate.

According to a preferred embodiment, opposite sides of said two adjacent self-capacitance electrodes are both set as a shape with fold line.

According to a further preferred embodiment, opposite sides of said two adjacent self-capacitance electrodes have matching stepped structures.

According to a further preferred embodiment, opposite sides of said two adjacent self-capacitance electrodes have matching concave-convex structures, respectively.

The embodiments of the present invention further provide a display device comprising any one in-cell touch screen described above.

According to a preferred embodiment, said display device includes a mobile phone, a tablet computer, a television, a computer display, a notebook computer, a digital frame, or a navigator.

The beneficial effects of the embodiments of the present invention include:

The in-cell touch screen and display device provided by the embodiments of the present disclosure multiplex the common electrode layer as self-capacitance electrodes using self-capacitance principle, modify the pattern of the common electrode layer to segment it into a plurality of self-capacitance electrodes independent from each other, and add on the array substrate touch control data lines that connect the respective self-capacitance electrodes to the touch control detection chip. Orthographic projections of the respective touch control data lines on the array substrate are all within areas where gaps between the pixel areas reside, such that they would be shielded by a black matrix in the touch screen and thus not affect the aperture ratio of pixel. The touch control detection chip can determine a touch control position by detecting variation in capacitance values of the respective self-capacitance electrodes in the touch control time period. Since the touch screen provided by the embodiments of the present invention modifies the structure of the common electrode layer to segment it into self-capacitance electrodes, it is not required to add additional process on the basis of the existing process of manufacturing an array substrate, saving the production cost and improving the production efficiency.

BRIEF DESCRIPTION OF THE DRAWINGS

The figures are included to provide further understanding of the embodiments. The figures are incorporated into the description and constitute a part thereof. The figures illustrate the embodiments and are used together with the description for explanation purposes only. Other embodiments may be conceived without undue experimentation and many expected advantages of the embodiments may be realized as a result of reference of the following detailed depictions. The elements of the figures are not necessarily drawn to scale. The same reference numbers indicate corresponding similar components.

DETAILED DESCRIPTION OF THE INVENTION

Specific implementations of the in-cell touch screen and display device provided by the embodiments of the present invention are explained in detail as follows in combination with the figures. In this regard, directional terms, such as "top", "bottom", "left", "right", "upper", "lower", etc. are used by reference to the orientation of the described figure. Since the components of the embodiments can be positioned in several different orientations, directional terms are used for illustrative purpose only and by no means for limitation purposes. It shall be understood that other embodiments can be used or logical modification can be made without departing from the scope of the present invention. Therefore, the following detailed depiction shall not be used to limit the scope of the disclosed invention. The scope of the present invention is defined by the enclosed claims.

In addition, the wording "on" used for a part, element or material layer formed or positioned "on" a surface can be used herein to indicate that said part, element or material layer is "directly" positioned (e.g. placed, formed, deposited, etc.) on the implied surface, e.g. in direct contact therewith. Additionally or alternatively, the wording "on" used for a part, element or material layer formed or positioned "on" a surface can be used herein to indicate that said part, element or material layer is positioned (e.g. placed, formed, deposited, etc.) "indirectly" on the implied surface, with one or more additional parts, elements or layers arranged between the implied surface and said part, element or material layer.

The thicknesses and shapes of the respective film layers in the figures are only exemplary and not drawn to scale, which only aim to explain the contents of the present invention.

Figure 1:
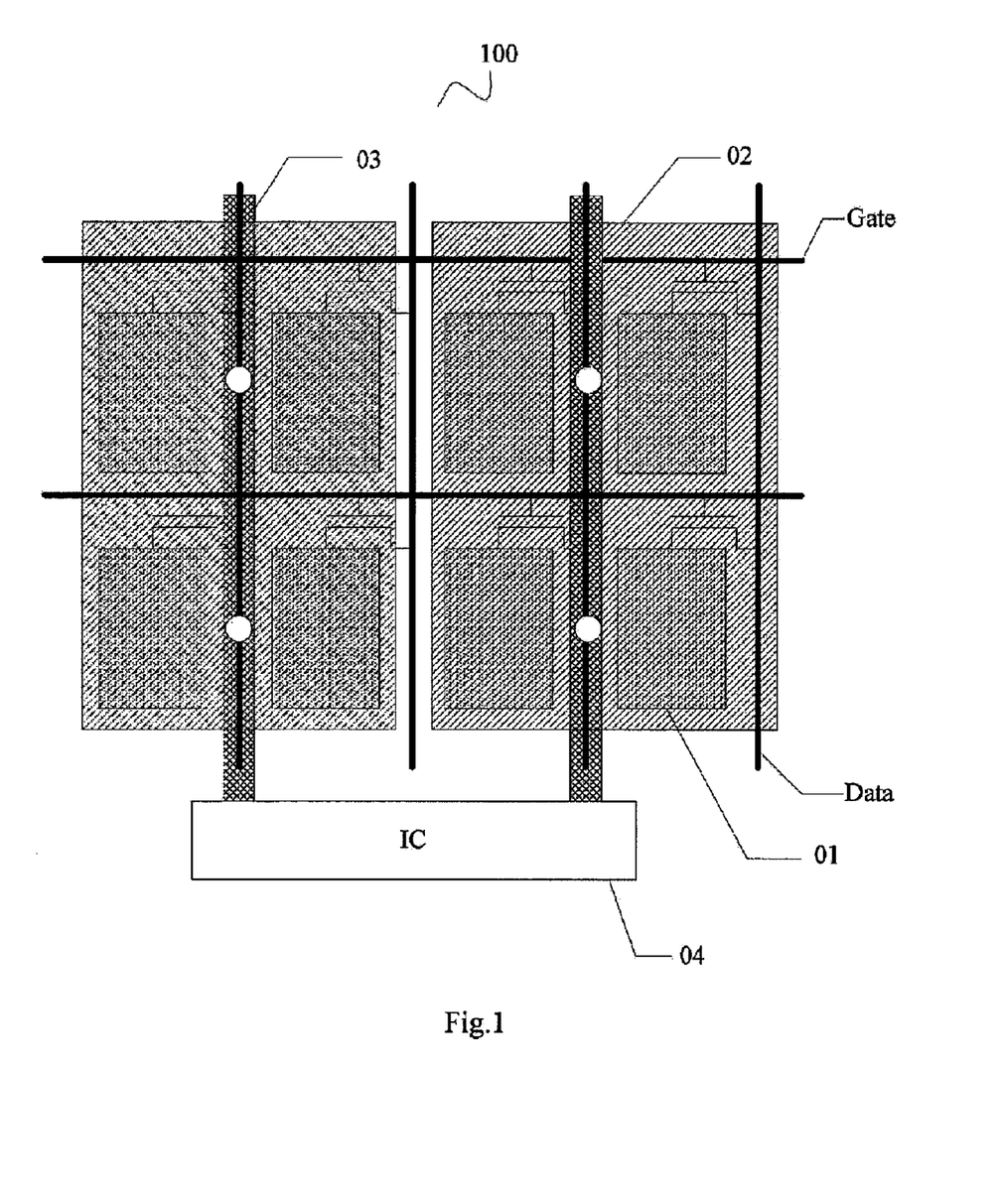
FIG. 1 is a structural schematic diagram of an in-cell touch screen provided by the embodiments of the present invention.

As shown in FIG. 1, an in-cell touch screen provided by the embodiments of the present invention is illustrated and comprises an array substrate 100 having a plurality of pixel areas 01 arranged in an array. The array substrate 100 is provided with a common electrode layer segmented into a plurality of mutually independent self-capacitance electrodes 02 and touch control data lines 03 which are arranged in a different layer from the self-capacitance electrodes 02 and connected to the self-capacitance electrodes 02, orthographic projections of the respective touch control data lines 03 on the array substrate 100 all being within areas in which gaps between the pixel areas 01 reside. The in-cell touch screen further comprises a touch control detection chip 04, which is connected to the respective self-capacitance electrodes 02 via the touch control data lines 03 for loading common electrode signals for the respective self-capacitance electrodes 02 via the touch control data lines 03 in a display time period. Further, the in-cell touch screen may be utilized for detecting variation in capacitance values of the respective self-capacitance electrodes 02 via the touch control data lines 03 in a touch control time period to determine a touch control position. Preferably, each self-capacitance electrode 02 covers several pixel areas 01.

The above in-cell touch screen provided by embodiments described herein multiplex the common electrode layer as the self-capacitance electrode 02 using self-capacitance principle, modify the pattern of the common electrode layer to segment it into a plurality of mutually independent self-capacitance electrodes 02; and add on the array substrate 100 touch control data lines 03 that connect the respective self-capacitance electrodes 02 to the touch control detection chip 04. Orthographic projections of the respective touch control data lines 03 on the array substrate 100 are all within areas in which gaps between the pixel areas 01 reside, such that the respective touch control data lines 03 would be shielded by a black matrix in the touch screen and thus not affect the aperture ratio of pixel. The touch control detection chip 04 can determine a touch control position by detecting variation in capacitance values of the respective self-capacitance electrodes 02 in the touch control time period. Since the touch screen provided by the embodiments of the present invention modifies the structure of the common electrode layer to segment it into self-capacitance electrodes 02, it is not required to add additional processes on the basis of the existing processes of manufacturing an array substrate, thus saving the production cost and improving the production efficiency.

Specifically, since the above touch screen provided by the embodiments of the present invention multiplexes the common electrode layer as the self-capacitance electrode 02, it is required to employ a manner of time division driving in the touch control and display phases (i.e. Time Division Multiplexing) in order to reduce mutual interference between display and touch control signals. Moreover, upon implementation, it is also possible to integrate the display drive chip and the touch control detection chip into one chip, further reducing the production cost.

Figure 3A:
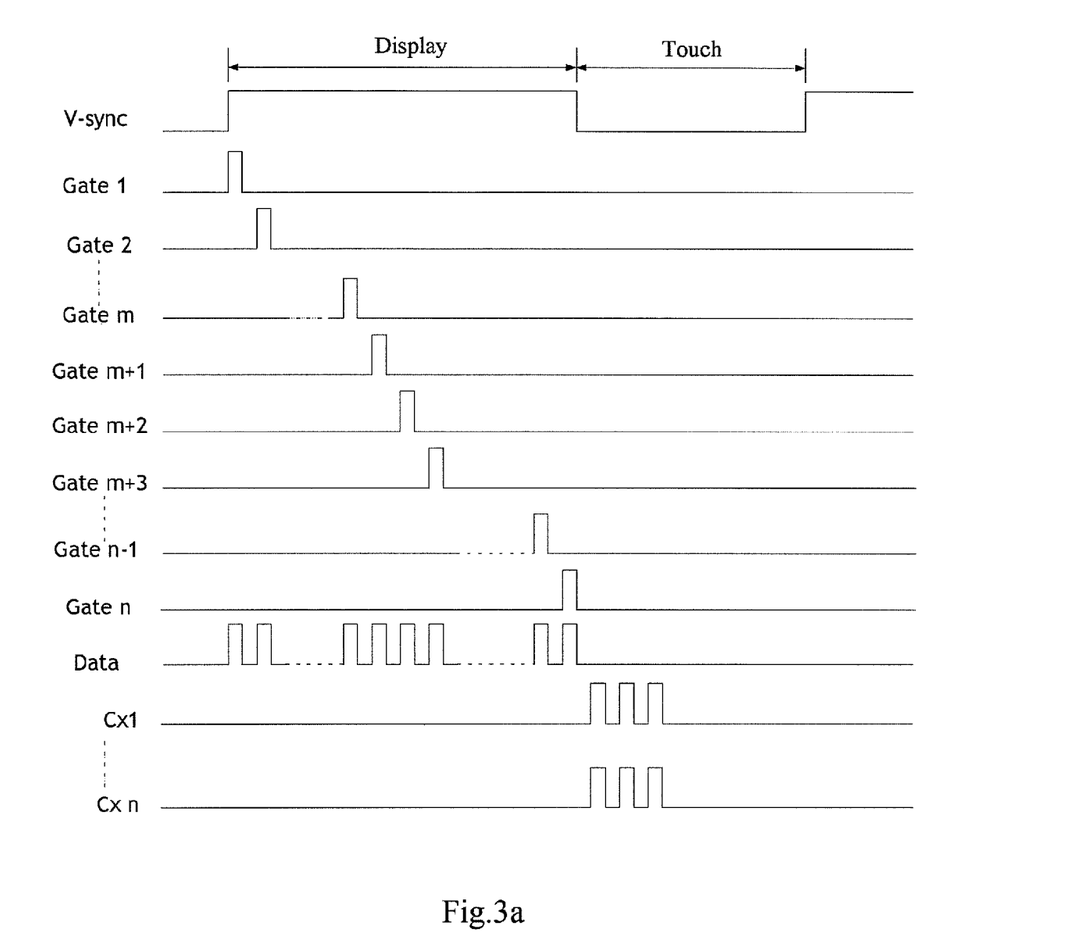
FIGS. 3a and 3b are driving timing diagrams of an in-cell touch screen provided by the embodiments of the present invention, respectively.
Figure 3B:
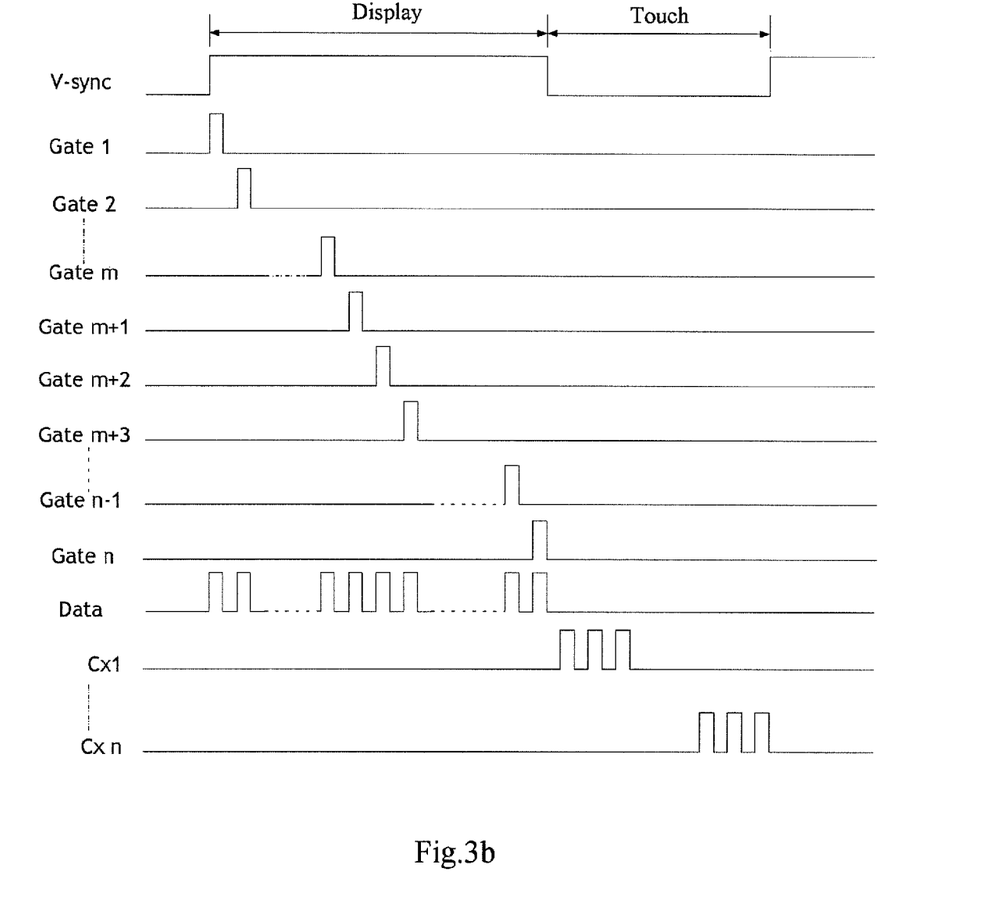

Specifically, for example, in the driving timing diagrams as shown in FIGS. 3a and 3b, the time for the touch screen to display each frame (V-sync) is divided into a display time period (Display) and a touch control time period (Touch). For example, in the driving timing diagrams as shown in FIGS. 3a and 3b, the time for the touch screen to display one frame is 16.7 ms, wherein 5 ms is selected as the touch control time period, while the remaining 11.7 ms serves as the display time period. In some embodiments, it is also possible to appropriately adjust the time lengths thereof according to the processing ability of the IC chip, which is not limited here. In the display time period (Display), each gate signal line $Gate_1$, $Gate_2$ . . . $Gate_n$ in the touch screen is applied with a gate scanning signal successively, the data signal line Data is applied with a gray scale signal, and the touch control detection chip connected to the respective self-capacitance electrodes $Cx_1$ . . . $Cx_n$ applies a common electrode signal to the respective self-capacitance electrodes $Cx_1$ . . . $Cx_n$, respectively, to carry out the liquid crystal display function. In the touch control time period (Touch), as shown in FIG. 3a, the touch control detection chip connected to the respective self-capacitance electrodes $Cx_1$ . . . $Cx_n$ applies a driving signal simultaneously to the respective self-capacitance electrodes $Cx_1$ . . . $Cx_n$, and receives feedback signals of the respective self-capacitance electrodes $Cx_1$ . . . $Cx_n$ simultaneously; As can also be shown in FIG. 3b, the touch control detection chip connected to the respective self-capacitance electrodes $Cx_1$ . . . $Cx_n$ applies a driving signal successively to the respective self-capacitance electrodes $Cx_1$ . . . $Cx_n$, and receives feedback signals of the respective self-capacitance electrodes $Cx_1$ . . . $Cx_n$, respectively, which is unlimited here. The feedback signals are analyzed to determine whether the touch control takes place so as to carry out the touch control function.

Generally, the density of the touch screen is at millimeter scale. Accordingly, upon implementation, it is possible to select the densities of the respective self-capacitance electrodes 02 and the area they occupy based on a desired touch control density to guarantee the desired touch control density. The respective self-capacitance electrode 02 is usually designed as a square electrode of about 5 mm*5 mm. However, the density of the display screen is usually at micron scale. Accordingly, one self-capacitance electrode 02 would generally correspond to a plurality of pixel areas in the display screen (FIG. 1 in which one self-capacitance electrode covers four pixel areas is just an illustrative diagram, which is not intended as a limitation). Moreover, the above in-cell touch screen provided by the embodiments of the present invention segments the existing common electrode layer arranged in the entire layer into a plurality of self-capacitance electrodes 02. To not affect the normal display function, at the time of segmenting the common electrode layer, the segmentation lines would generally avoid the opening areas of display and are arranged in the graphic area of the black matrix layer.

Further, in the above touch screen provided by the embodiments of the present invention, as shown in FIG. 1, the array substrate 100 generally further comprises: gate signal lines Gate and data signal lines Data which are crossly arranged. Two adjacent gate signal lines Gate and data signal lines Data form one pixel area 01.

To facilitate connection of the self-capacitance electrode 02 to the touch control detection chip 04 via the touch control data line 03, the extension direction of the touch control data line 03 can generally be set to be identical with that of the gate signal line Gate, or identical with that of the data signal line Data. That is, the extension directions of the respective touch control data lines 03 may be identical.

Further, when the touch screen has a relatively large size, if the wiring is performed in the way of setting the extension directions of all the respective touch control data lines 03 to be identical, the touch control data line 03 connected between the self-capacitance electrode 02 and the touch control detection chip 04 may be so long that the signal transmission is delayed. Therefore, in order to prevent occurrence of the above situation, the bezel of the in-cell touch screen usually has four sides, and the respective self-capacitance electrodes 02 can be connected to the touch control detection chip 04 after being connected to the nearest side via the corresponding touch control data lines 03 on the basis that the touch control data lines 03 do not cross with each other. It is noted that the leads set at the sides for connecting the touch control data lines 03 to the touch control detection chip 04 can be designed to have a larger line width without limitation by gaps between the pixel areas, and hence would not affect the signal transmission.

In addition, regardless of whether the extension directions of the respective touch control data lines 03 are distributed laterally or longitudinally or interleavingly, in order to guarantee overall uniform wiring of the array substrate, it shall be ensured upon design that the touch control data lines 03 are distributed as uniformly as possible on the array substrate.

Figure 2A:
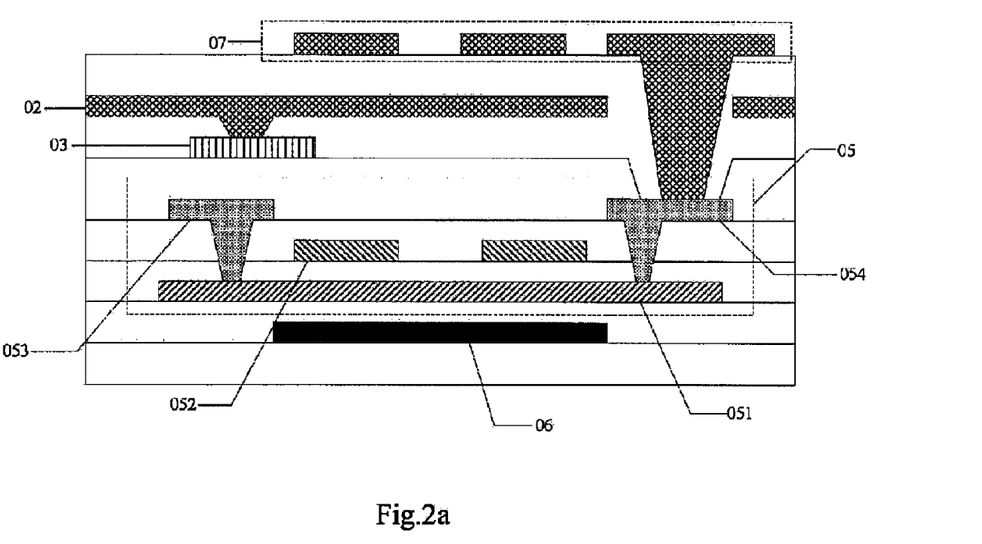
FIGS. 2a-2d are side-view schematic diagrams of an in-cell touch screen provided by the embodiments of the present invention, respectively.
Figure 2B:
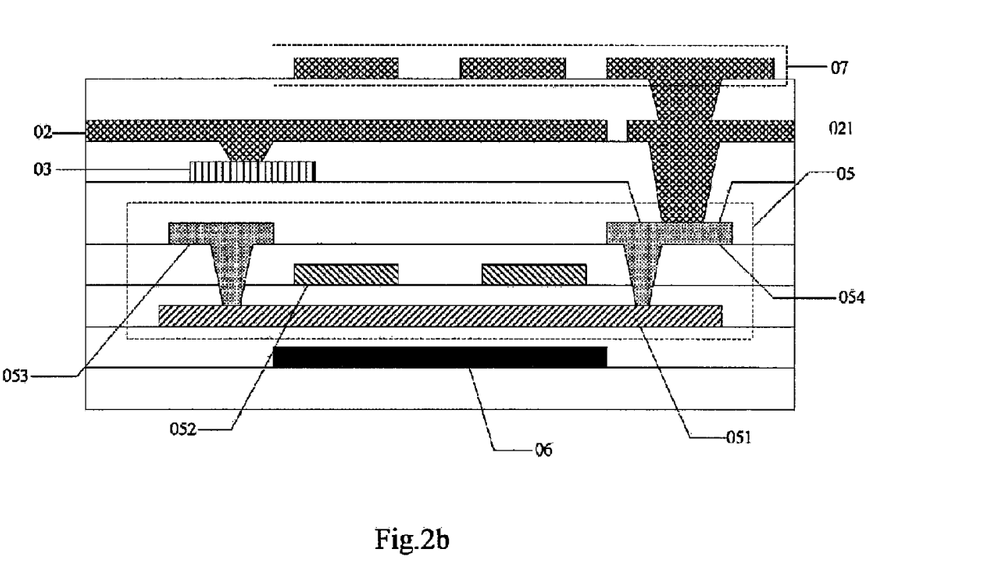

Upon implementation, in the above in-cell touch screen provided by the embodiments of the present invention, a thin film transistor structure 05 located below the common electrode layer is generally further provided within one pixel area of the array substrate 100 as shown in FIGS. 2a-2b.

Specifically, the thin film transistor structure 05 comprises an active layer 051, a gate 052, a source 053 and a drain 054. Specifically, the thin film transistor structure 05 may be a bottom-gate-type thin film transistor or a top-gate-type thin film transistor upon implementation, as shown in FIGS. 2a-2d. Moreover, when the thin film transistor structure 05 is a top-gate-type thin film transistor, as shown in FIGS. 2a-2d, a shading layer 06 is generally further provided between the top-gate-type thin film transistor and the base substrate; an orthographic projection of the pattern of the shading layer 06 on the array substrate covers an orthographic projection of the pattern of the gate 052 in the thin film transistor structure on the array substrate.

Furthermore, in the above in-cell touch screen provided by the embodiments of the present invention, to facilitate conduction of the touch control data lines 03 with the self-capacitance electrodes 02, upon implementation, it is possible to arrange the touch control data lines 03 in a film layer between the common electrode layer and the thin film transistor structure 05, as shown in FIGS. 2a-2d.

Figure 2C:
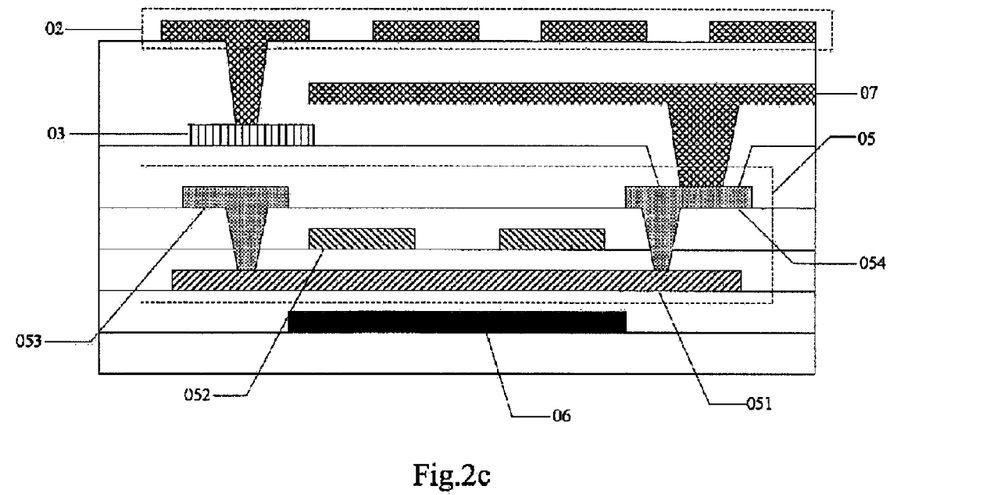
Figure 2D:
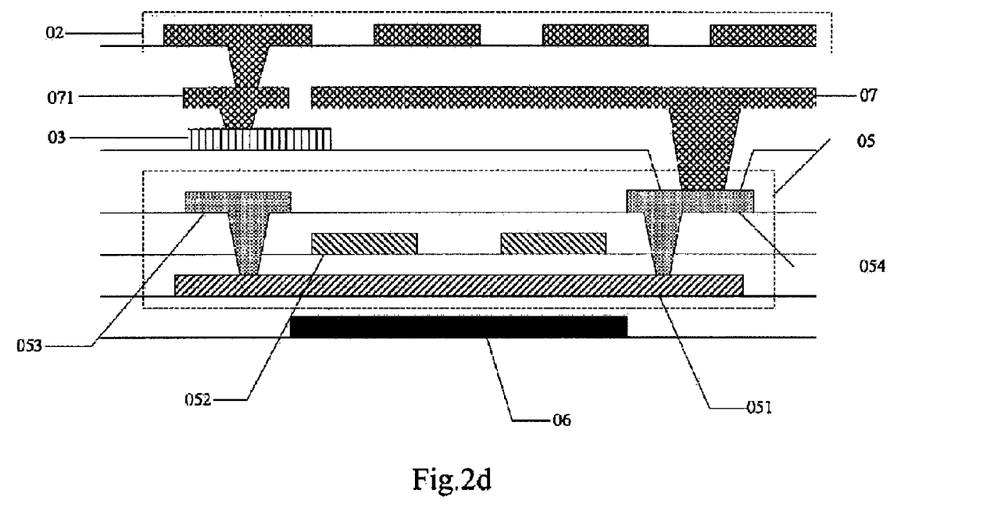

In some embodiments, as shown in FIGS. 2a-2d, the array substrate 100 would further be provided with a pixel electrode layer 07 that is arranged in a different layer from the common electrode layer. Generally, as shown in FIGS. 2a and 2b, on a traditional ADS-type liquid crystal panel, the common electrode layer also acts as the self-capacitance electrodes 02 is located in a lower layer (closer to the base substrate) as a plate-like electrode and the pixel electrodes 07 are located in an upper layer (closer to the liquid crystal layer) as slit electrodes. An insulating layer is provided between the pixel electrode 07 and the common electrode layer. As shown in FIGS. 2c and 2d, on an HADS-type liquid crystal panel, the pixel electrode 07 is located in a lower layer (closer to the base substrate) as a plate-like electrode and the common electrode layer multiplexed as the self-capacitance electrodes 02 is located in an upper layer (closer to the liquid crystal layer) as slit electrodes. An insulating layer is provided between the pixel electrodes 07 and the common electrode layer.

Specifically, according to the mode of the liquid crystal display panel in which the above touch screen is specifically applied, the respective self-capacitance electrodes 02 that constitute the common electrode layer may have a slit-like ITO electrode structure or a plate-like ITO electrode structure at the positions corresponding to the opening areas of pixel. That is, in the HADS mode the respective self-capacitance electrodes 02 consist of slit-like ITO electrodes. Specifically, the slit-like ITO electrode structure has slit ITO electrodes in the opening areas of pixel. In the ADS mode the respective self-capacitance electrodes 02 consist of plate-like ITO electrodes to meet the requirement of liquid crystal display. At that time, the self-capacitance electrodes 02 can interact with the electric field of the human body through the slit areas of the pixel electrodes 07. The specific structures of the liquid crystal panels in the ADS mode and the HADS mode belong to the prior art, thus detailed descriptions will not be repeated herein.

Further, in order to increase the variation resulting from the capacitance of the human body as sensed by the self-capacitance electrodes 02 in the touch control time period, it is preferred to arrange the common electrode layer that consist of the respective self-capacitance electrodes 02 above the pixel electrode 07, i.e. to use the HADS mode, so as to make the self-capacitance electrodes 02 as close to the electric field of the human body as possible.

Further, when the HADS mode is used, as shown in FIG. 2c, it can be seen that there are a plurality of film layers between the self-capacitance electrode 02 and the connected touch control data line 03. The self-capacitance electrode 02 needs to connect to the touch control data line 03 by means of a via penetrating these film layers. Accordingly, upon implementation, in order to ensure that the self-capacitance electrode 02 and the touch control data line 03 can be better connected from top to bottom, as shown in FIG. 2d, when the pixel electrode 07 is located between the common electrode layer and the film layer where the touch control data line 03 resides, the array substrate is further provided with a first conducting part 071 which is arranged in the same layer as and insulated from the pixel electrode 07. The self-capacitance electrode 02 can be connected to the respective touch control data line 03 through the first conducting part 071.

Likewise, when the ADS mode is used, as shown in FIG. 2a, there are a plurality of film layers between the drain 054 of the thin film transistor and the connected pixel electrode 07, and the pixel electrode 07 needs to connect to the drain 054 of the thin film transistor by means of a via penetrating these film layers. Accordingly, upon implementation, in order to ensure that the pixel electrode 07 and the drain 054 of the thin film transistor can be better connected from top to bottom, as shown in FIG. 2b, when the pixel electrode 07 is located above the common electrode layer, the array substrate is further provided with a second conducting part 021 which is set in the same layer as and insulated from the common electrode layer; and the drain 054 of the thin film transistor can be connected to the respective pixel electrode 07 through the second conducting part 021.

Further, in the in-cell touch screen provided by the embodiments of the present invention, since the capacitance of the human body acts on the self-capacitances of the respective self-capacitance electrodes 02 by means of direct coupling, when the human body touches the screen, only the capacitance values of the self-capacitance electrodes 02 below the touch position have a larger amount of variation, while the capacitance values of the self-capacitance electrodes 02 adjacent to the self-capacitance electrodes 02 below the touch position have a very small amount of variation. In this way, when a part such as a finger of the human body slides on the touch screen, the touch control coordinates within the area where the self-capacitance electrodes 02 reside cannot be determined. To solve this problem, in the above in-cell touch screen provided by the embodiments of the present invention, it is possible to set the opposite sides of two adjacent self-capacitance electrodes 02 as fold lines to increase the amount of variation in the capacitance values of the self-capacitance electrodes 02 adjacent to the self-capacitance electrodes 02 below the touch position.

Figure 4A:
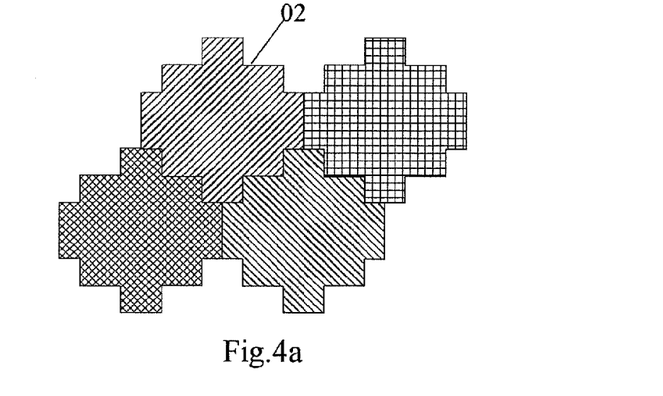
FIGS. 4a and 4b are structural schematic diagrams of opposite sides of adjacent self-capacitance electrodes which are set as fold lines, in an in-cell touch screen provided by the embodiments of the present invention, respectively.

Upon implementation, the overall shape of the respective self-capacitance electrodes 02 can be set using either of the following two manners or combination thereof:

1. It is possible to set the opposite sides of two adjacent self-capacitance electrodes 02 which are fold lines as stepped structures. The two opposite stepped structures are identical in shape and match each other, as shown FIG. 4a. FIG. 4a shows 2*2 self-capacitance electrodes 02.

Figure 4B:
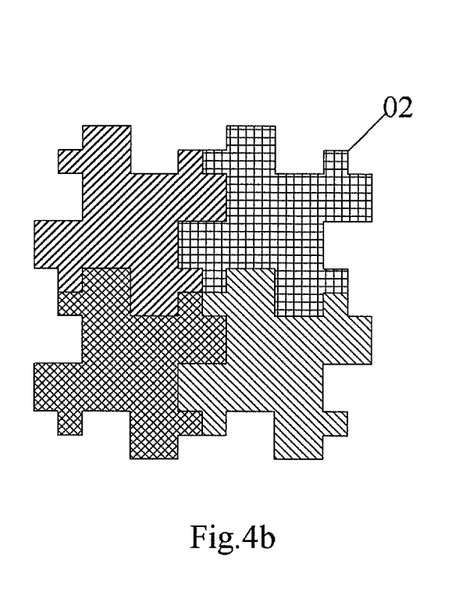

2. It is possible to set the opposite sides of two adjacent self-capacitance electrodes 02 which are fold lines as concave-convex structures. The two opposite concave-convex structures are identical in shape and match each other, as shown in FIG. 4b. FIG. 4b shows 2*2 self-capacitance electrodes 02.

On the basis of the same inventive concept, the embodiments of the present invention further provide a display device comprising the above in-cell touch screen provided by the embodiments of the present invention. The display device may be any product or component having display function such as mobile phone, tablet computer, television, display, notebook computer, digital frame, navigator, and so on. The implementation of the display device may refer to the embodiments of the above in-cell touch screen, repeated details of which are not given here.

The in-cell touch screen and display device provided by the embodiments of the present invention multiplex the common electrode layer as self-capacitance electrodes using self-capacitance principle, modify the pattern of the common electrode layer to segment it into a plurality of independent self-capacitance electrodes, and add on the array substrate touch control data lines that connect the respective self-capacitance electrodes to the touch control detection chip. Orthographic projections of the respective touch control data lines on the array substrate are all within areas where gaps between the pixel areas reside, such that they would be shielded by a black matrix in the touch screen and thus not affect the aperture ratio of pixel. The touch control detection chip can determine a touch control position by detecting variation in capacitance values of the respective self-capacitance electrodes in the touch control time period. Since the touch screen provided by the embodiments of the present invention modifies the structure of the common electrode layer to segment it into self-capacitance electrodes, it is not required to add additional processes on the basis of the existing process of manufacturing an array substrate, saving the production cost and improving the production efficiency.

Obviously, those skilled in the art can make various modifications and variations to the present invention without departing from the spirit and scope thereof. In this way, if these modifications and variations to the present invention pertain to the scopes of the claims of the present invention and equivalent techniques thereof, the present invention also intends to include these modifications and variations. The wording "comprise" in the claims does not exclude the presence of elements or steps not listed in the claims. The wording "a/an" or "one" preceding an element does not exclude the presence of a plurality of such elements. The simple fact of reciting certain measures in different dependent claims does not indicate that the combination of these measures cannot be used for improvement.

The invention claimed is:

1. An in-cell touch screen, comprising an array substrate having a plurality of pixel areas arranged in an array, wherein said array substrate is provided with:
    a common electrode layer segmented into a plurality of self-capacitance electrodes independent from each other; and
    touch control data lines which are arranged in a different layer from and connected to said self-capacitance electrodes, wherein orthographic projections of said respective touch control data lines on said array substrate all being within areas where gaps between the pixel areas reside;
    wherein said in-cell touch screen further comprises a touch control detection chip which is connected to the respective self-capacitance electrodes via said touch control data lines, wherein said touch control detection chip is used for loading a common electrode signal for said respective self-capacitance electrodes via said touch control data lines in a display time period, and wherein detecting variation in capacitance values of said respective self-capacitance electrodes via said touch control data lines in a touch control time period determines a touch control position, and
    wherein leads that are arranged at said sides for connecting said touch control data lines to said touch control detection chip are designed to have a wider line width than said touch control data lines.

2. The in-cell touch screen according to claim 1, wherein each of said self-capacitance electrodes covers a plurality pixel areas.

3. The in-cell touch screen according to claim 1, wherein each of the respective pixel areas of said array substrate is provided with a thin film transistor structure which is located below said common electrode layer and closer to a substrate of said array substrate, wherein said touch control data lines are located in a film layer between said common electrode layer and said thin film transistor structure.

4. The in-cell touch screen according to claim 3, wherein said array substrate is further provided with gate signal lines and data signal lines which are arranged crossly to each other; and
    wherein the extension direction of said touch control data lines is identical with that of said gate signal lines, or identical with that of said data signal lines.

5. The in-cell touch screen according to claim 4, wherein said touch control data lines are distributed uniformly on said array substrate.

6. The in-cell touch screen according to claim 3, wherein a bezel of said in-cell touch screen has four sides, wherein said respective self-capacitance electrodes are connected to said touch control detection chip after being connected to a nearest side of the bezel via the corresponding touch control data lines on a basis that said touch control data lines do not cross with each other.

7. The in-cell touch screen according to claim 3, wherein said array substrate is further provided with pixel electrodes located between said common electrode layer and a film layer where said touch control data lines reside.

8. The in-cell touch screen according to claim 7, wherein said array substrate is further provided with first conducting parts which are arranged in the same layer as and insulated from said pixel electrode, and wherein said self-capacitance electrode is connected to a respective touch control data line via said first conducting part.

9. The in-cell touch screen according to claim 7, wherein said common electrode layer is a plate-like electrode, said pixel electrode is a slit electrode, and wherein an insulating layer is provided between said pixel electrode and said common electrode layer.

10. The in-cell touch screen according to claim 9, wherein said slit electrode has a slit structure at a position corresponding to an opening area of said pixel area.

11. The in-cell touch screen according to claim 7, wherein said pixel electrodes and said common electrodes layer are both ITO electrodes.

12. The in-cell touch screen according to claim 3, wherein said array substrate is further provided with pixel electrodes which are located above said common electrode layer and farther away from said array substrate.

13. The in-cell touch screen according to claim 12, wherein said array substrate is further provided with second conducting parts which are arranged in the same layer as and insulated from said common electrode layer, and wherein a drain of said thin film transistor is connected to said pixel electrode via said second conducting part.

14. The in-cell touch screen according to claim 12, wherein said pixel electrode is a plate-like electrode, wherein said common electrode layer is a slit electrode, and wherein an insulating layer is provided between said pixel electrode and said common electrode layer.

15. The in-cell touch screen according to claim 14, wherein said slit electrode has a slit structure at a position corresponding to an opening area of said pixel area.

16. The in-cell touch screen according to claim 3, wherein said thin film transistor structure is a bottom-gate-type thin film transistor or a top-gate-type thin film transistor.

17. The in-cell touch screen according to claim 16, wherein when said thin film transistor structure is a top-gate-type thin film transistor, a shading layer is further provided between said top-gate-type thin film transistor and said substrate; and wherein an orthographic projection of a pattern of said shading layer on said array substrate covers an orthographic projection of a pattern of the gate in said thin film transistor structure on said array substrate.

18. The in-cell touch screen according to claim 1, wherein opposite sides of said two adjacent self-capacitance electrodes are both set as a shape with fold line.

19. A display device comprising the in-cell touch screen according to claim 1.

* * * * *